United States Patent

Moberg et al.

[11] Patent Number: 5,809,398
[45] Date of Patent: Sep. 15, 1998

[54] CHANNEL SELECTIVE REPEATER

[75] Inventors: Tommy Moberg, Hässelby Strand; Anders Pravitz, Huddinge, both of Sweden

[73] Assignee: Allgon AB, Akersberga, Sweden

[21] Appl. No.: 648,027
[22] PCT Filed: May 10, 1995
[86] PCT No.: PCT/SE95/00517
§ 371 Date: May 14, 1996
§ 102(e) Date: May 14, 1996
[87] PCT Pub. No.: WO95/31866
PCT Pub. Date: Nov. 23, 1995

[30] Foreign Application Priority Data

May 11, 1994 [SE] Sweden .................. 9401640

[51] Int. Cl.⁶ .................. H04B 7/15
[52] U.S. Cl. .................. 455/17; 455/22
[58] Field of Search .................. 455/15, 16, 17, 455/19, 20, 22, 11.1, 422, 507, 517, 524, 73, 575, 307, 313, 314, 315, 316, 317, 318

[56] References Cited

U.S. PATENT DOCUMENTS

| 4,317,216 | 2/1982 | Kaegebein . |
| 4,754,495 | 6/1988 | Kawano et al. . |
| 4,941,200 | 7/1990 | Leslie et al. . |

FOREIGN PATENT DOCUMENTS

| 0274857A1 | 12/1987 | European Pat. Off. . |
| 0302455A2 | 8/1988 | European Pat. Off. . |
| 5-235819A | 2/1993 | Japan . |
| 2204214 | 3/1988 | United Kingdom . |

*Primary Examiner*—Thanh Cong Le
*Attorney, Agent, or Firm*—Jacobson, Price, Holman & Stern, PLLC

[57] ABSTRACT

An improved repeater for receiving and re-transmitting radio signals for a cell in a cellular telecommunication system. The repeater raises the levels and is capable of converting the frequencies of the radio signals used in the telecommunication system. Due to the power amplifiers being provided between the channel selecting means and combiner, the power amplifier needs only to amplify one frequency band. In this way the repeater gets a simpler design, demands less maintenance, and gets a higher degree of efficiency in combination of high power capacity and generation of low levels only of intermodulation products.

14 Claims, 2 Drawing Sheets

CHANNEL SELECTIVE REPEATER

BACKGROUND OF THE INVENTION

1. Technical Field

The invention relates to an amplification device, a so-called repeater, for receiving and transmitting RF signals, which are preferably analogically or digitally frequency modulated and are present in cellular telecommunication systems. Specifically, the invention relates to a repeater which improves, through reception, amplification, and, preferably directed, re-transmission of the RF signals, transmitting and receiving performance of a, preferably, mobile terminal and a, preferably, stationary radio unit, in particular a base station, in one or several parts of a cell in at least one cellular telecommunication system.

2. Description of the Related Art

Prior art repeaters of the present type normally include two principally similar branches, one branch for down-link communication from the base station to the mobile terminal (the cellular telephone), and one branch for up-link communication from the mobile terminal to the base station. Each of these branches include for instance

- a radiator means for incoming and outgoing signals connected to
- a duplex means, which has a connection for said outgoing signals and a connection for said incoming signals, the latter being connected to
- a multicoupler, which in turn s connected to at least the input of a channel selecting means, which includes
- at the input a first mixer connected to
- a filter for channel selecting connected to
- a second mixer connected to the output of the channel selecting means, wherein
- a frequency generator generates a signal to the first and the second mixer, and
- a combiner connected, via any one of its inputs, to the output of the channel selecting means, the output of said combiner being connected in turn, via a power amplifier, to the connection of the duplex means for outgoing signals in the second branch. This provides improved transmitting and receiving performance through an amplification and, possibly, a re-direction of the RF signals in the frequency ranges required for the radio communication between the subscriber terminal and the base station.

A prior art repeater of above mentioned type does not have a very high degree of efficiency due to the way in which its power amplifiers are arranged. These power amplifiers amplify all, or at least several, frequency ranges or channels amplified by the repeater. This requires firstly that each power amplifier is capable of providing all of the required output power for its respective branch. Secondly, it is required, as is customary in these applications, that the amplifier does not generate such high levels of mixing frequencies or intermodulation products that the communication is disturbed in the system itself or in other systems. Physically, intermodulation products occur when different frequencies are mixed in a non-linear element. The above mentioned requirements on the power amplifier will not be met by an amplifier with a very high degree of efficiency. A relatively expensive and complicated, so-called, class A amplifier would probably be necessary.

This way of arranging the power amplifiers between the combiner and the duplex means thus requires high power in order to obtain such high linearity in the power amplifiers that their internal generation of intermodulation products is kept at an acceptable level.

Another repeater of a similar type is known through the U.S. Pat. No. 4,754,495, which is incorporated by reference into this disclosure. This device does not aim at solving the above mentioned problems. In its capacity of constituting relevant art it forms, however, one basis of the invention. Some important characteristics of this prior art repeater is found in the preamble of claim 1.

Another repeater is known From the U.S. Pat. No. 4,941,200. This repeater, which in addition to its amplifier function is arranged to monitor and manipulate the signalling in a cell in a radio communication systems, employs well-known prior art from base stations for controlling and amplifying RF signals in order to meet a frequent and common standard for cellular telecommunication.

SUMMARY OF THE INVENTION

The invention is based on the object to provide a repeater, for a cellular telecommunication system, said repeater having a simpler design, a lower demand for maintenance, and a high degree of efficiency in combination with high power capacity and generation of low levels only of intermodulation products. A repeater according to the invention is intended mainly for raising (in a part of a cell) the levels and, possibly, converting the frequencies of the RF signals used in the telecommunication system. On the other hand the repeater according to the invention does not aim at manipulating the RF signals in other ways.

The above mentioned object is attained according to the invention through a repeater with the characteristics of the independent claim 1 or 2. Due to the power amplification after the channel selecting taking place before the combiner, the amplifier needs only to amplify one frequency (one frequency band), at which the mentioned solution is obtained. The devices described in claims 1 and 2 provide similar solutions to problems that relate specifically to different standards for cellular telecommunication.

Advantageous further developments of the invention are described in the dependent claims 3–8.

DETAILED DESCRIPTION OF THE PREFERRED EMBODIMENTS

Figure 1:
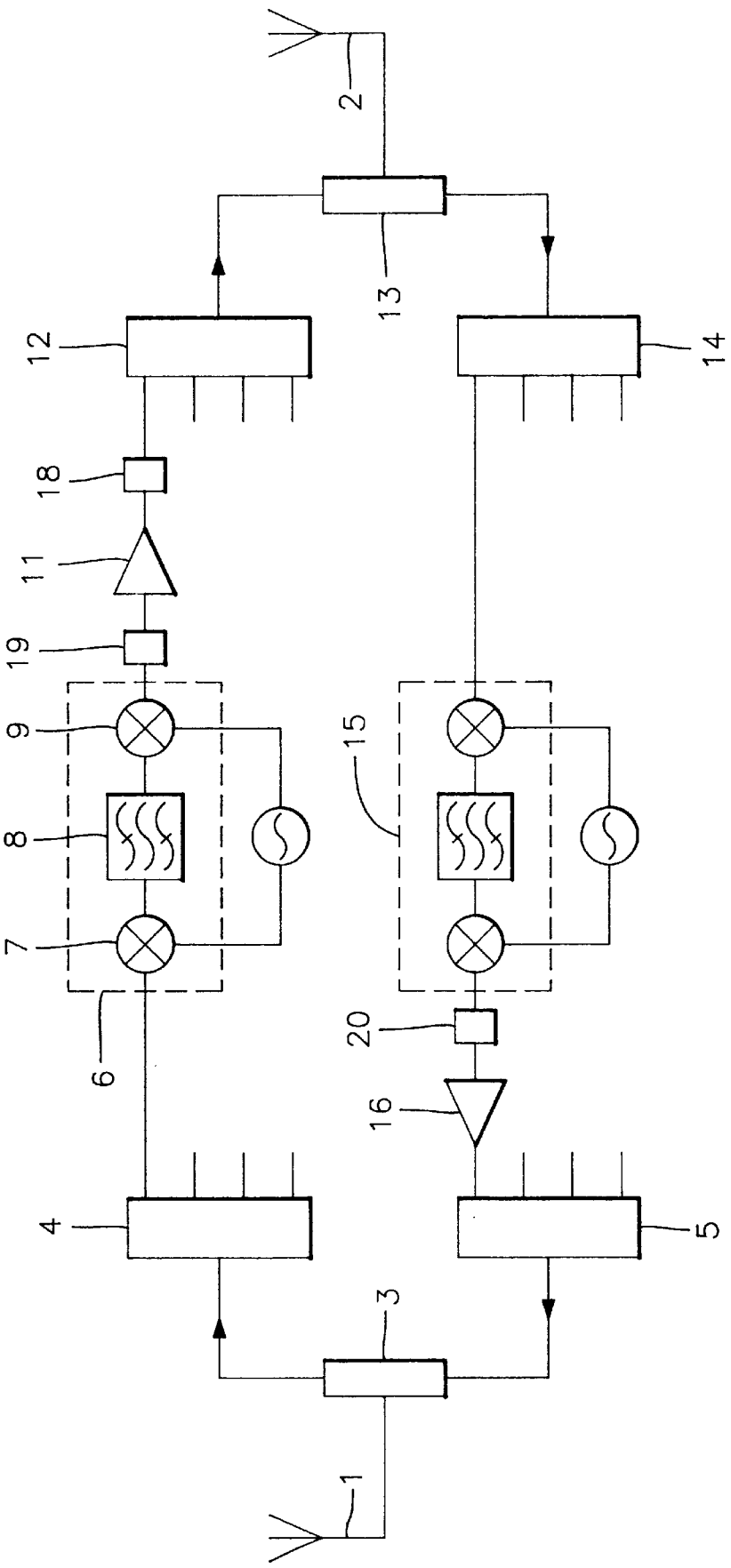
FIG. 1 shows the fundamental design of a repeater in a first embodiment according to the invention.

FIG. 1 shows a block diagram of a repeater in a first embodiment according to the invention. This includes a first radiator means 1 for first incoming and first outgoing RF signals between a base station (not shown) and the repeater as well as a second radiator means 2 for second incoming and second outgoing RF signals between the repeater and a subscriber terminal (not shown). Preferably, corresponding incoming and outgoing signals have the same frequency, i.e., the first incoming and the second outgoing signals have the same frequency and vice versa.

The first radiator means is connected via a first connection to a first duplex means 3, for example a circulator or a duplex filter, which has a second and a third connection as well. Between these connections signals are transferred in such a way that an incoming signal is transferred only to an adjacent connection on the one side, in FIG. 1 the left side. The second and the third connections, respectively, of the first duplex means 3 transfer the first incoming and the first outgoing RF signals, respectively.

The first incoming RF signals are led to an input of a first multicoupler 4 which distributes the RF signals to two or more outputs (four outputs shown in FIG. 1). Each of the outputs of the multicoupler 4 is connected to the input of a channel selecting means 6 (only one shown in FIG. 1 in connection with the multicoupler 4), which selects (separates) only one carrier wave (frequency). The channel selecting means 6 is also provided with an output.

The channel selecting means 6 may have several different forms. In the embodiment shown in FIG. 1 it includes, connected to its input, a first mixer 7 connected to a filter 8, preferably a band pass filter that transfers a predetermined frequency band only, which filter 8 is connected to a second mixer 9, which in turn is connected to the output of the channel selecting means 6. In addition the first and the second mixers 7, 9 are both connected to a frequency generator 10 arranged outside of the channel selecting means 6, which frequency generator 10 provides a mixing frequency signal thereto.

The output of the channel selecting means 6 (and corresponding outputs of other channel selecting means situated in the repeater and intended for the first RF signals) is connected to a power amplifier 11 corresponding thereto. This may consist of one or several amplifying stages. The power amplifier 11 needs to amplify and transfer mainly only the carrier frequency (channel) of the first incoming RF signals, which have been transposed a certain frequency range by the first mixer 7, transferred by the filter 8, and transposed back the same frequency range by the second mixer 9.

Inside the frequency band transferred by the amplifier 11 there is only one carrier wave (frequency). The amplifier 11 may be frequency selective, i.e., attenuating in itself certain frequency bands, and/or further filter means 19, 20 may be arranged between the mixer 9 and the amplifier 11 (and before amplifier 16) for strongly attenuating unwanted frequencies (intermodulation products) generated in the mixer 9. The fact that only one carrier wave is to be amplified permits that the amplifier 11 is given a relatively simple design, since it needs not to be so strictly linear as an amplifier, which amplifies several different frequencies with the requirement of low internal generation of intermodulation products. Also the amplifier 11 may hereby be designed for lower power consumption.

Further, filter and/or circulator means 18 are preferably arranged after the power amplifier 11 for suppressing of intermodulation products unwanted in the radio communication and/or unwanted interaction between RF signals transferred by different channel selecting means. For example disturbances are hereby avoided between different calls (RF signals) which are transferred simultaneously by the repeater.

The output of the channel selecting means 6 is connected, via the corresponding amplifier 11, to an input of a preferably passive combiner 12. This is provided with an additional number of inputs and one output, said number of inputs preferably being equal to the number of outputs of the multicoupler 4 and to the number of channel selecting means 6 for the first incoming RF signals.

The output of the combiner 12 is connected to a third input of a second duplex means 13, the function of which corresponds fully to that of the first duplex means 3. Via the first connection of the duplex means 13, the first incoming RF signals are thus transferred to a second radiator means 2, where they turn per definition into second outgoing RF signals to be transferred from the base station to the subscriber terminal (which are not shown in FIG. 1).

In a way corresponding to what is described above, the second incoming and outgoing signals, respectively, are transferred in the repeater by the second radiator means 2, the second duplex means 13, the second multicoupler 14, second channel selecting means 15 (only one shown in FIG. 1), a second amplifier 16, a second combiner 5, the first duplex means 3, and the first radiator means 1.

Figure 2:
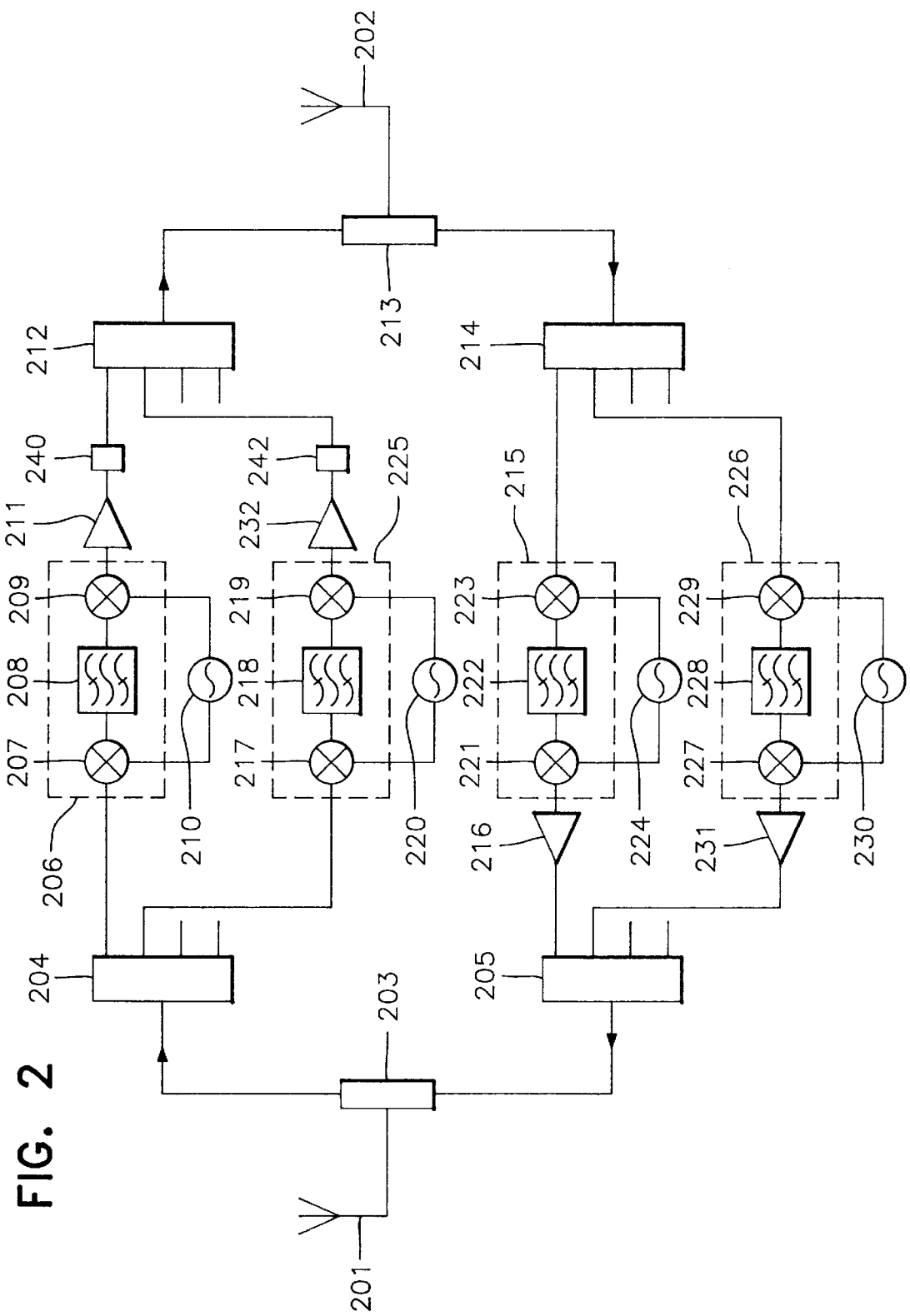
FIG. 2 shows the fundamental design of a repeater in a second embodiment according to the invention.

FIG. 2 shows a block diagram of a repeater in a first embodiment according to the invention. This includes firstly a first radiator means 201 for first incoming and first outgoing RF signals between a base station (not shown) and the repeater as well as a second radiator means 200 for second incoming and second outgoing RF signals between the repeater and a subscriber terminal (not shown). Preferably, corresponding incoming and outgoing signals have frequencies separated by a predetermined frequency range.

The first radiator means is connected via a first connection to a first duplex means 203, for example a circulator or a duplex filter, which has a second and a third connection as well. Between these connections signals are transferred in such a way that an incoming signal is transferred only to an adjacent connection on the one side, in FIG. 2 the left side. The second and the third connections, respectively, of the first duplex means 203 transfer the first incoming and the first outgoing RF signals, respectively.

The first incoming RF signals are led to an input of a first multicoupler 204 which distributes the RF signals to two or more outputs (four outputs shown in FIG. 2). At least a first one of the outputs of the multicoupler 204 is connected to the input of a channel selecting means 206 (only one shown in FIG. 2 in connection with the multicoupler 4), which selects (separates) only one carrier wave (frequency). At least a second one of the outputs of the multicoupler 204 is connected to the input of a channel selecting means 225 (only one shown in FIG. 2 in connection with the multicoupler 204), which selects (separates) one frequency band. The channel selecting means 206 and the band selecting means 225 are also provided with one output each.

The channel selecting means 206 may have several different forms. In the embodiment shown in FIG. 2 it includes, connected to its input, a first mixer 207 connected to a filter 208, preferably a band pass filter that transfers a predetermined frequency (channel) only, which filter 208 is connected to a second mixer 209, which in turn is connected to the output of the channel selecting means 206. In addition the first and the second mixers 207, 209 are both connected to a frequency generator 210 arranged outside of the channel selecting means 206, which frequency generator 210 provides a mixing frequency signal thereto. The mixing frequency signals output to the first and the second mixers 207, 209 may have different frequencies.

The band selecting means 225 may have several different forms. In the embodiment shown in FIG. 2 a first mixer 217 is connected to a filter 218, preferably a band pass filter that transfers only a predetermined frequency band (preferably several carrier waves), which filter 218 is connected to a second mixer 219, which in turn is connected to the output of the band selecting means 225. In addition its first and second mixers 217, 219 are both connected to a frequency generator 220 arranged outside of the band selecting means 225, which frequency generator 220 provides mixing frequency signals thereto. The mixing frequency signals output to the first and the second mixers 217, 219 may have different frequencies.

The output of the channel selecting means 206 and the band selecting means, respectively, (and corresponding outputs of other possible channel/band selecting means situated in the repeater and intended for the first incoming RF signals) are connected to a first and a second power amplifier 211 and 232, respectively, corresponding thereto. These may consist of one or several amplifying stages. The power amplifier 211 needs to amplify and transfer mainly only the carrier frequency (channel) of the first incoming RF signals, which have been transposed a certain frequency range by the first mixer 207, transferred by the filter 208, and transposed again a predetermined frequency range by the second mixer 209. Consequently the second power amplifier 232 needs to amplify and transfer preferably a full frequency band with several carrier waves (frequencies) includes in the first incoming RF signals. The second power amplifier 232, as opposed to the first power amplifier 211, needs to have a broad bandwidth and strictly linear characteristics.

Inside the narrow frequency band transferred by the first amplifier 211 there is only one carrier wave (frequency). The amplifier 211 may be frequency selective, i.e., attenuating in itself certain frequency bands, and/or further filter means (not shown) may be arranged between the mixer 209 and the amplifier 211 for strongly attenuating unwanted frequencies (intermodulation products) generated in the mixer 209. The fact that only one carrier wave is to be amplified permits that the amplifier 211 is given a relatively simple design, since it needs not to be as strictly linear as an amplifier, which amplifies several different frequencies with the requirement of low internal generation of intermodulation products. Also the amplifier 211 may hereby be designed for lower power consumption.

Further, filter and/or circulator means 240 are preferably arranged after the power amplifier 211 for suppressing of intermodulation products unwanted in the radio communication and/or of unwanted interaction between RF signals transferred by different channel selecting means. For example disturbances are hereby avoided between different calls (RF signals) which are transferred simultaneously by the repeater. In a similar way corresponding means 242 may be arranged for the second power amplifier 232.

The output of the channel selecting means 206 and the band selecting means 225, respectively, are connected, via the corresponding first and second amplifiers 211 and 232, respectively, to a first and a second input, respectively, of a preferably passive combiner 212. This may be provided with an additional number of inputs and one output, said number of inputs preferably being equal to the number of outputs of the multicoupler 204 and to the number of band/channel selecting means 206 for the first incoming RF signals.

The output of the combiner 212 is connected to a third input of a second duplex means 213, the function of which corresponds fully to that of the First duplex means 203. Via the first connection of the duplex means 213, the first incoming RF signals are thus transferred to a second radiator means 202, where they turn per definition into second outgoing RF signals to be transferred from the base station to the subscriber terminal (which are not shown in FIG. 2).

In a way corresponding to what is described above the second incoming and outgoing signals, respectively, are transferred in the repeater by the second radiator means 202, the second duplex means 213, the second multicoupler 214, second channel selecting means 215 (only one shown in FIG. 2) and second channel selecting means 215 (only one shown in FIG. 2), respectively, further amplifiers 216 and 231, respectively, a second combiner 205, the first duplex means 203, and the first radiator means 201.

Numerous alternative embodiments and further developments of the invention are possible within the scope of the invention, including achieving high efficiency, simple design and satisfactory disturbance limitation through arranging the power amplifier in such a way that only one frequency is amplified by the respective power amplifier. Obvious to a person skilled in the art are also different combinations of amplifiers and filters, as long as the power amplification of the RF signals in the repeater takes place between the channel selecting means and combiners.

We claim:

1. A repeater for improving the transmitting and receiving performance in radio communication between a subscriber terminal and a base station in parts of a cell in a cellular telecommunication system, said repeater comprising, in a first of two fundamentally alike branches, whereof one is intended for communication from the base station to the subscriber terminal and one for communication in the other direction, a radiator means for incoming and outgoing signals connected to a duplex means, which also has a connection for said outgoing signals and a connection for said incoming signals, the connection for said incoming signals being connected to a multicoupler, which is connected, via at least one of its outputs, to an input of a channel selecting means, which includes on the input, a first mixer connected to a filter for channel selection connected to a second mixer connected to the output of the channel selecting means, and a combiner connected via one of its inputs to the output of the channel selecting means, the output of said combiner being connected in turn to the connection of the duplex means for outgoing signals in the second branch, wherein power amplifying means are arranged for amplifying said outgoing signals in each branch, characterized in that, in the first and the second branch, a power amplifier is arranged between said channel selecting means and the associated input of the combiner, whereas no amplifying means is provided between the combiner and the associated radiator means;

that said first and second mixers are connected to a common mixing frequency generator, wherein said power amplifier is arranged to amplify and transfer the carrier frequency of the incoming signals, which have been transposed a certain frequency range by the first mixer, transferred by the filter, and transposed back the same frequency range by the second mixer, so that corresponding incoming signals and outgoing signals have the same frequency; and that filter means are arranged between the power amplifier and the combiner in order to suppress intermodulation products unwanted in the radio communication and/or unwanted interaction between RF signals transferred by the different channel selecting means, whereby it is achieved in the repeater a high efficiency, simple design and low internal generation of disturbing intermodulation products for the radio communication between the subscriber terminal and the base station.

2. The repeater according to claim 1, wherein the combiner is passive.

3. The repeater according to claim 1, wherein filter means are arranged between the second mixer and the power amplifier in order to suppress intermodulation products unwanted in the radio communication.

4. A repeater for improving the transmitting and receiving performance in radio communication between a subscriber terminal and a base station in parts of a cell in a cellular telecommunication system, said repeater comprising, in a first of two fundamentally alike branches, whereof one is intended for communication from the base station to the subscriber terminal and one for communication in the other direction,
- a radiator means for incoming and outgoing signals connected to
- a duplex means, which also has a connection for said outgoing signals and a connection for said incoming signals, the connection for said incoming signals being connected to
- a multicoupler, which is connected partly, via at least one of its outputs, to the input of a channel selecting means, which includes
  - at the input a first mixer connected to
  - a filter for channel selection connected to
  - a second mixer connected to the output of the channel selecting means,
  - partly, via at least a second one of its outputs, to the input of a band selecting means, which includes
    - at the input a third mixer connected to
    - a filter for band selection connected to
    - a fourth mixer connected to the output of the band selecting means, and
  - a combiner connected, via a first and a second of its inputs, respectively, to the channel selecting means, and to the output of the band selecting means, respectively,
- the output of said combiner in turn is connected to a connection of the duplex means for outgoing signals in the second branch, wherein power amplifying means are arranged for amplifying said outgoing signals in each branch, characterized in
- that, in the first and the second branch, a first power amplifier is provided between said channel selecting means and the first input of the combiner, and a linear, second power amplifier is provided between the band selecting means and the second input of the combiner, whereas no amplifying means is provided between the combiner and the associated radiator means;
- that the said first and second mixers are connected to a common first mixing frequency generator, wherein said first power amplifier is arranged to amplify and transfer the carrier frequency of the incoming signals, which have been transposed a certain frequency range by the first mixer, transferred by the filter, and transposed back the same frequency range by the second mixer, and that the said third and fourth mixers are connected to a common second mixing frequency generator, wherein said second power amplifier is arranged to amplify and transfer the carrier frequency of the incoming signals, which have been transposed a certain frequency range by the third mixer, transferred by the filter, and transposed back the same frequency range by the fourth mixer, so that corresponding incoming signals and outgoing signals have the same frequency; and

- that filter means are arranged between the first power amplifier and the first input of the combiner, and between the second power amplifier and the second input of the combiner, in order to suppress intermodulation products unwanted in the radio communication and/or unwanted interaction between RF signals transferred by the different channel selecting means,
- whereby it is achieved in the repeater a high efficiency, simple design and low internal generation of disturbing intermodulation products for the radio communication between the subscriber terminal and the base station.

5. The repeater according to claim 4, wherein the combiner is passive.

6. The repeater according to claim 4, wherein filter means are arranged between the second mixer and the first power amplifier and between the fourth mixer and the second power amplifier in order to suppress intermodulation products unwanted in the radio communication.

7. A repeater for improving the transmitting and receiving performance in radio communication between a subscriber terminal and a base station in parts of a cell in a cellular telecommunication system, said repeater comprising, in a first of two fundamentally alike branches, whereof one is intended for communication from the base station to the subscriber terminal and one for communication in the other direction,
- a radiator means for incoming and outgoing signals connected to
- a duplex means, which also has a connection for said outgoing signals and a connection for said incoming signals, the connection for said incoming signals being connected to
- a multicoupler, which is connected, via at least one of its outputs, to an input of a channel selecting means, which includes
  - on the input, a first mixer connected to
  - a filter for channel selection connected to
  - a second mixer connected to the output of the channel selecting means, and
- a combiner connected via one of its inputs to the output of the channel selecting means,
- the output of said combiner being connected in turn to the connection of the duplex means for outgoing signals in the second branch, wherein power amplifying means are arranged for amplifying said outgoing signals in each branch, characterized in
- that, in the first and the second branch, a power amplifier is arranged between said channel selecting means and the associated input of the combiner, whereas no amplifying means is provided between the combiner and the associated radiator means;
- that said first and second mixers are connected to a common mixing frequency generator, wherein said power amplifier is arranged to amplify and transfer the carrier frequency of the incoming signals, which have been transposed a certain frequency range by the first mixer, transferred by the filter, and transposed back the same frequency range by the second mixer, so that corresponding incoming signals and outgoing signals have the same frequency; and
- that circulator means are provided between the power amplifier and the combiner for suppressing intermodulation products unwanted to the radio communication and/or unwanted interaction between RF signals transferred by the channel selecting means, whereby it is achieved in the repeater a high efficiency, simple design and low internal generation of disturbing intermodulation products for the radio communication between the subscriber terminal and the base station.

8. The repeater according to claim 7, wherein the combiner is passive.

9. The repeater according to claim 7, wherein filter means are arranged between the second mixer and the power amplifier in order to suppress intermodulation products unwanted in the radio communication.

10. A repeater for improving the transmitting and receiving performance in radio communication between a subscriber terminal and a base station in parts of a cell in a cellular telecommunication system, said repeater comprising, in a first of two fundamentally alike branches, whereof one is intended for communication from the base station to the subscriber terminal and one for communication in the other direction, a radiator means for incoming and outgoing signals connected to a duplex means, which also has a connection for said outgoing signals and a connection for said incoming signals, the connection for said incoming signals being connected to a multicoupler, which is connected partly, via at least one of its outputs, to the input of a channel selecting means, which includes
at the input a first mixer connected to
a filter for channel selection connected to
a second mixer connected to the output of the channel selecting means,
partly, via at least a second one of its outputs, to the input of a band selecting means, which includes
at the input a third mixer connected to
a filter for band selection connected to
a fourth mixer connected to the output of the band selecting means, and
a combiner connected, via a first and a second of its inputs, respectively, to the channel selecting means, and to the output of the band selecting means, respectively, the output of said combiner in turn is connected to a connection of the duplex means for outgoing signals in the second branch, wherein power amplifying means are arranged for amplifying said outgoing signals in each branch, characterized in that, in the first and the second branch, a first power amplifier is provided between said channel selecting means and the first input of the combiner, and a linear, second power amplifier is provided between the band selecting means and the second input of the combiner, whereas no amplifying means is provided between the combiner and the associated radiator means;

that the said first and second mixers are connected to a common first mixing frequency generator, wherein said first power amplifier is arranged to amplify and transfer the carrier frequency of the incoming signals, which have been transposed a certain frequency range by the first mixer, transferred by the filter, and transposed back the same frequency range by the second mixer, and that the said third and fourth mixers are connected to a common second mixing frequency generator, wherein said second power amplifier is arranged to amplify and transfer the carrier frequency of the incoming signals, which have been transposed a certain frequency range by the third mixer, transferred by the filter, and transposed back the same frequency range by the fourth mixer, so that corresponding incoming signals and outgoing signals have the same frequency; and that circulator means are provided between the first power amplifier and the first input of the combiner, and between the second power amplifier and the second input of the combiner, for suppressing intermodulation products unwanted to the radio communication and/or unwanted interaction between RF signals transferred by the channel selecting means, whereby it is achieved in the repeater a high efficiency, simple design and low internal generation of disturbing intermodulation products for the radio communication between the subscriber terminal and the base station.

11. The repeater according to claim 10, wherein the combiner is passive.

12. The repeater according to claim 10, wherein filter means are arranged between the second mixer and the first power amplifier and between the fourth mixer and the second power amplifier in order to suppress intermodulation products unwanted in the radio communication.

13. A repeater for improving the transmitting and receiving performance in radio communication between a subscriber terminal and a base station in parts of a cell in a cellular telecommunication system, said repeater comprising, in a first of two fundamentally alike branches, whereof one is intended for communication from the base station to the subscriber terminal and one for communication in the other direction, a radiator means for incoming and outgoing signals connected to a duplex means, which also has a connection for said outgoing signals and a connection for said incoming signals, the connection for said incoming signals being connected to a multicoupler, which is connected, via at least one of its outputs, to an input of a channel selecting means, which includes
on the input, a first mixer connected to
a filter for channel selection connected to
a second mixer connected to the output of the channel selecting means,
a frequency generator generating a signal to the first and the second mixers, and
a combiner connected via one of its inputs to the output of the channel selecting means, the output of said combiner being connected in turn to the connection of the duplex means for outgoing signals in the second branch, wherein power amplifying means are arranged for amplifying said outgoing signals in each branch, characterized in that, in the first and the second branch, a power amplifier is arranged between said channel selecting means and the associated input of the combiner, that filter or circulator means are arranged between the power amplifier and the combiner in order to suppress intermodulation products unwanted in the radio communication and/or unwanted interaction between RF signals transferred by the different channel selecting means, whereby it is achieved in the repeater a high efficiency, simple design and low internal generation of disturbing intermodulation products for the radio communication between the subscriber terminal and the base station.

14. A repeater for improving the transmitting and receiving performance in radio communication between a subscriber terminal and a base station in parts of a cell in a cellular telecommunication system, said repeater comprising, in a first of two fundamentally alike branches, whereof one is intended for communication from the base station to the subscriber terminal and one for communication in the other direction, a radiator means for incoming and outgoing signals connected to a duplex means, which also has a connection for said outgoing signals and a connection for said incoming signals, the connection for said incoming signals being connected to a multicoupler, which is connected partly, via at least one of its outputs, to the input of a channel selecting means, which includes at the input a first mixer connected to a filter for channel selection connected to a second mixer connected to the output of the channel selecting means, a first frequency generator generating a signal to the first and the second mixers, partly, via at least a second one of its outputs, to the input of a band selecting means, which includes a combiner connected, via a first and a second of its inputs, respectively, to the channel selecting means, and to the output of the band selecting means, respectively, the output of said combiner in turn is connected to a connection of the duplex means for outgoing signals in the second branch, wherein power amplifying means are arranged for amplifying said outgoing signals in each branch, characterized in that, in the first and the second branch, a first power amplifier is provided between said channel selecting means and the first input of the combiner, and a linear, second power amplifier is provided between the band selecting means and the second input of the combiner, that filter means are arranged between the first power amplifier and the first input of the combiner, and between the second power amplifier and the second input of the combiner, in order to suppress intermodulation products unwanted in the radio communication and/or unwanted interaction between RF signals transferred by the different channel selecting means, whereby it is achieved in the repeater a high efficiency, simple design and low internal generation of disturbing intermodulation products for the radio communication between the subscriber terminal and the base station.

\* \* \* \* \*

UNITED STATES PATENT AND TRADEMARK OFFICE
CERTIFICATE OF CORRECTION

PATENT NO.   : 5,809,398
DATED        : September 15, 1998
INVENTOR(S)  : Tommy MOBERG et al.

It is certified that error appears in the above-identified patent and that said Letters Patent is hereby corrected as shown below:

| | |
|---|---|
| Column 1, | line 27, change "s" to --is--. |
| Column 2, | line 33, change "claim 1 or 2" to --claims--; |
| | line 37, delete "in claims 1 and 2"; |
| | line 41, delete "3-8". |
| Column 4, | line 17, change "200" to --202--. |
| Column 5, | line 57, change "First" to --first--. |
| Column 6, | line 42, change "wherein" to --and--; |
| | line 51, change "wherein" to --and--. |
| Column 7, | line 40, change "wherein" to --and--; |
| | line 53, delete "wherein"; |
| | line 57, before "filter" insert --channel selection--; |
| | line 58, delete "and"; |
| | line 61, change "wherein" to --and--; |
| | line 62, change "carrier frequency" to --frequency band--; |
| | line 65, before "filter" insert --band selection--. |
| Column 8, | line 46, change "wherein" to --and--; |
| | line 55, change "wherein" to --and--. |

UNITED STATES PATENT AND TRADEMARK OFFICE
CERTIFICATE OF CORRECTION

PATENT NO. : 5,809,398
DATED : September 15, 1998
INVENTOR(S) : Tommy MOBERG et al.

It is certified that error appears in the above-identified patent and that said Letters Patent is hereby corrected as shown below:

Column 9,  line 45, change "wherein" to --and--;

line 57, delete "wherein";

line 59, change "carrier frequency" to --frequency band--;

line 62, before "filter" insert --channel selection--;

line 63, delete "and" (first occurrence);

line 65, change "wherein" to --and--;

line 67, change "carrier frequency" to --frequency band--.

Column 10,  line 2, before "filter" insert --band selection--;

line 52, change "wherein" to --and--.

Column 12,  line 3, change "wherein" to --and--.

Signed and Sealed this

Seventh Day of March, 2000

Attest:

Attesting Officer

Q. TODD DICKINSON

Commissioner of Patents and Trademarks